(No Model.)
D. M. PINCKNEY.
SPRINKLING APPARATUS.
No. 522,229. Patented July 3, 1894.
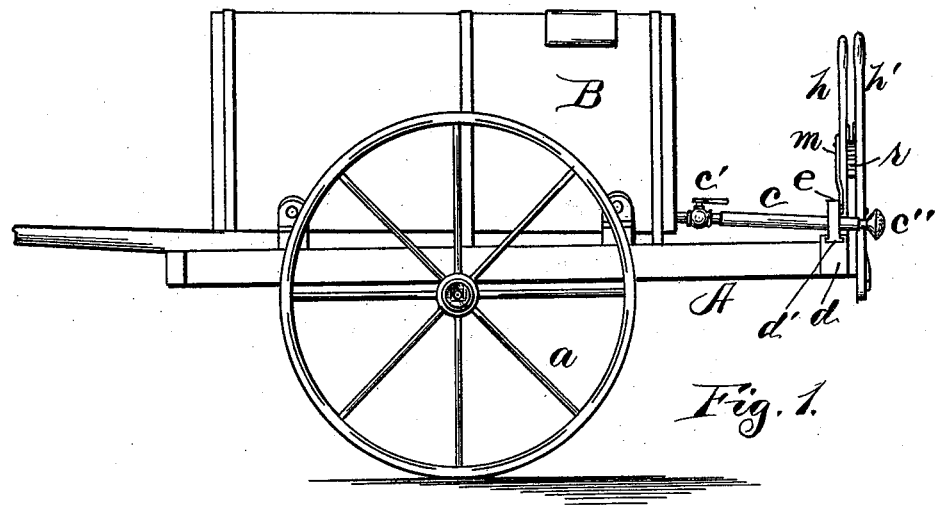
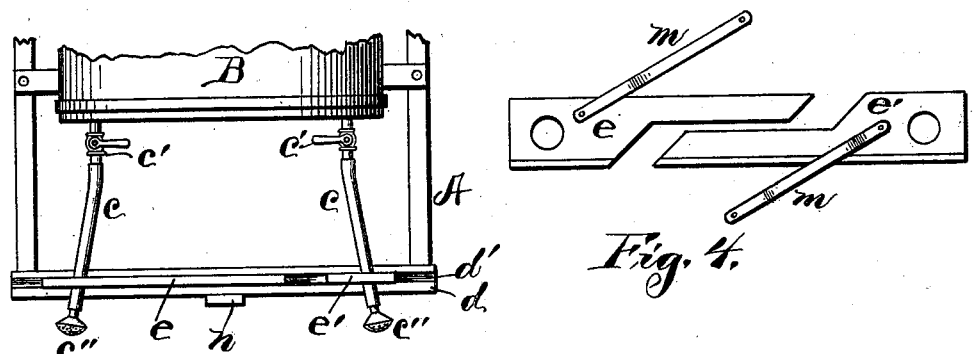
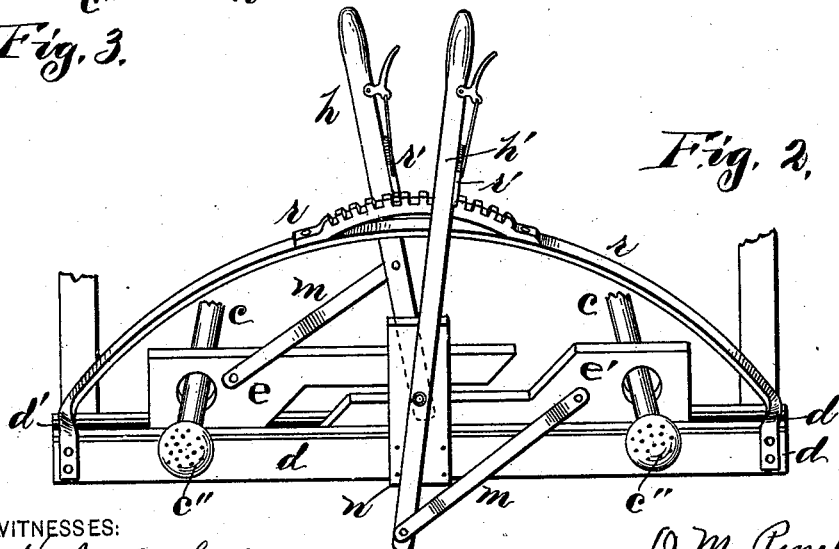
WITNESSES:
H. A. Carhart,
C. B. Kinne
INVENTOR
D. M. Pinckney
BY
Smith & Denison
ATTORNEYS.

UNITED STATES PATENT OFFICE.

DEMPSTER M. PINCKNEY, OF ONONDAGA, NEW YORK.

SPRINKLING APPARATUS.

SPECIFICATION forming part of Letters Patent No. 522,229, dated July 3, 1894.

Application filed September 15, 1893. Serial No. 485,554. (No model.)

*To all whom it may concern:*

Be it known that I, DEMPSTER M. PINCKNEY, of South Onondaga, in the county of Onondaga, in the State of New York, have invented new and useful Improvements in Sprinkling Apparatus, of which the following, taken in connection with the accompanying drawings, is a full, clear, and exact description.

My invention relates to sprinkling apparatus and particularly to that class designed or adapted to sprinkle plants in rows.

My object is to produce an improved sprinkler, adapted, for illustration, to sprinkle two or more rows of potatoes, with a solution of paris green, or other liquid either to kill bugs and insects or to water them to promote growth, consisting of a tank set on a cart, discharge pipes connected to the tank and each provided with a sprinkler nozzle, each pipe being connected to a slide by which its sprinkler can be shifted laterally to adjust the apparatus for rows of different widths, each being adjustable independently of the other, either in the same or in opposite directions.

My invention consists in the several novel features of construction and operation hereinafter described and which are specifically set forth in the claims hereunto annexed. It is constructed as follows reference being had to the accompanying drawings, in which—

Figure 1, is a side elevation of a cart, a tank thereon, and the sprinkling apparatus connected to the tank. Fig. 2, is a rear elevation of the sprinkling apparatus, omitting the cart and tank. Fig. 3, is a top plan of part of the tank, and its supporting frame, and of the sprinkling apparatus, omitting the adjusting levers. Fig. 4, is an elevation of the sliding pipe carriers, and the links connected thereto.

A, is the body of a cart, consisting of a frame mounted upon an axle and wheels —$a$— provided with shafts or pole —$b$—. B, is a tank mounted upon said frame. Discharge pipes —$c$— are connected to the tank, each provided with a stop-cock —$c'$— and a suitable sprinkling nozzle —$c''$—. The rear cross-bar —$d$— of said frame is provided with ways —$d'$— in or upon which the slides —$e$—$e'$— are mounted so as to be traversed in either direction, jointly or singly, by means of the levers —$h$—$h'$— connected respectively to said slides by the links —$m$—, said levers being pivoted upon the standard —$n$— erected upon said cross-bar; and —$r$— is a rack-bar with which the ratchets —$r'$— upon the levers engage, and by which the levers are set at any desired point. By shifting either of said levers, the slide connected to the lever operated, is traversed in its way, and shifts the nozzle of the pipe, connected to the slide, in the direction and to the extent the slide is moved, so that said nozzles can be moved in toward each other, out away from each other, or both in the same direction, to accommodate the apparatus to rows of different widths apart, or to shift both to sprinkle up hill when the cart is driven along a sloping surface or side hill.

What I claim as my invention, and desire to secure by Letters Patent, is—

1. A sprinkling apparatus comprising a tank mounted upon a wheeled base, flexible discharge pipes connected to said tank and provided with nozzles, a grooved frame in the rear of said tank, and slides mounted in said grooved frame, and to which said pipes are connected and means to reciprocate said slides independently, in combination.

2. A sprinkling apparatus comprising a tank mounted upon a wheeled base, a grooved frame in rear of said tank, slides mounted in said groove, flexible discharge pipes mounted upon said slides and connected to said tank, shut off valves in said pipes, and ratchet levers connected to said slides, in combination.

In witness whereof I have hereunto set my hand this 12th day of September, 1893.

DEMPSTER M. PINCKNEY.

In presence of—
C. W. SMITH,
HOWARD P. DENISON.